(12) United States Patent
Morita

(10) Patent No.: US 7,738,135 B2
(45) Date of Patent: Jun. 15, 2010

(54) IMAGE PROCESSOR, IMAGE FORMING DEVICE, METHOD FOR IMAGE PROCESSING AND STORAGE MEDIUM FOR STORING IMAGE PROCESSING PROGRAM

(75) Inventor: Tokihiro Morita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1104 days.

(21) Appl. No.: 11/399,486

(22) Filed: Apr. 7, 2006

(65) Prior Publication Data
US 2007/0091343 A1    Apr. 26, 2007

(30) Foreign Application Priority Data
Oct. 21, 2005    (JP)    ............................ 2005-307399

(51) Int. Cl.
G06K 15/00    (2006.01)
G06F 3/12     (2006.01)

(52) U.S. Cl. .................... 358/1.18; 358/1.13; 358/1.15; 358/448

(58) Field of Classification Search ................. 358/1.1, 358/1.2, 1.4, 1.5, 1.6, 1.9, 1.11, 1.12, 1.13, 358/1.14, 1.15, 1.16, 1.17, 1.18, 501, 401, 358/404, 407, 448, 444, 468; 382/173; 715/200, 715/273, 274; 399/1, 8, 9, 361, 363, 364, 399/365; 347/2, 3, 5, 14, 23
See application file for complete search history.

(56) References Cited

U.S. PATENT DOCUMENTS 6,827,279 B2 *  12/2004  Teraura ...................... 235/492

FOREIGN PATENT DOCUMENTS

JP    A 10-051622    2/1998

OTHER PUBLICATIONS

Machine Translation of JP 10051622 A, Sekiguchi et al., Feb. 1998.*

* cited by examiner

Primary Examiner—Dov Popovici
(74) Attorney, Agent, or Firm—Oliff & Berridge, PLC

(57) ABSTRACT

An image processor is provided with an acquisition unit; a discriminating unit; a decomposing unit; and a rearranging unit. The acquisition unit acquires image data and layout information of an original document which are obtained by reading the original document in which the layout information is recorded in advance. The discriminating unit discriminates number of logical pages in the original document, an arranged order of the logical pages, and orientation of the original document, based on the layout information. The decomposing unit decomposes the image data into the logical pages, based on the result of the discriminating. The rearranging unit rearranges the decomposed logical pages according to a predetermined output layout, and outputs image data in which the logical pages has been rearranged.

16 Claims, 3 Drawing Sheets

IMAGE PROCESSOR, IMAGE FORMING DEVICE, METHOD FOR IMAGE PROCESSING AND STORAGE MEDIUM FOR STORING IMAGE PROCESSING PROGRAM

CROSS-REFERENCE TO RELATED APPLICATION

This application claims priority under 35 USC 119 from Japanese Patent Application No. 2005-307399, the disclosure of which is incorporated by reference herein.

BACKGROUND

1. Technical Field

The present invention relates to an image processor, an image forming device, a method for image processing and a storage medium for storing an image processing program, and, more particularly, to an image processor which can read an original document image for a copier, a printer and the like, or can output an image after the read image is laid out again, an image forming device provided with the above image processor, a method for image processing and a storage medium for storing an image processing program and the like.

2. Related Art

Conventionally, it has been widely known that an image forming device, such as a copier and a printer, has a function by which image forming is performed in a format different from that of an original document having plural leaves. There is, for example, a function (hereinafter, called Nup) by which, according to an original document of a number N of pages, images are formed within one page.

However, since characters in a read image are processed as one image regardless of the writing form in a language, such as Japanese, which has both forms of vertical writing (writing from top to bottom) and horizontal writing (writing from left to right), there have been sometimes unfavorable cases in which processing is performed as horizontal writing when an original document of plural pages is laid out into images in one page by Nup.

SUMMARY

According to a first aspect of the present invention, there is provided an image processor. The image processor includes: an acquisition unit that acquires image data and layout information of an original document which are obtained by reading the original document in which the layout information is recorded in advance; a discriminating unit that discriminates number of logical pages in the original document, an arranged order of the logical pages, and orientation of the original document, based on the layout information; a decomposing unit that decomposes the image data into the logical pages, based on the result of the discriminating; and a rearranging unit that rearranges the decomposed logical pages according to a predetermined output layout, and outputs image data in which the logical pages has been rearranged.

BRIEF DESCRIPTION OF THE DRAWINGS

Embodiment of the present invention will be described in detail based on the following figures, wherein.

DETAILED DESCRIPTION

Figure 1:
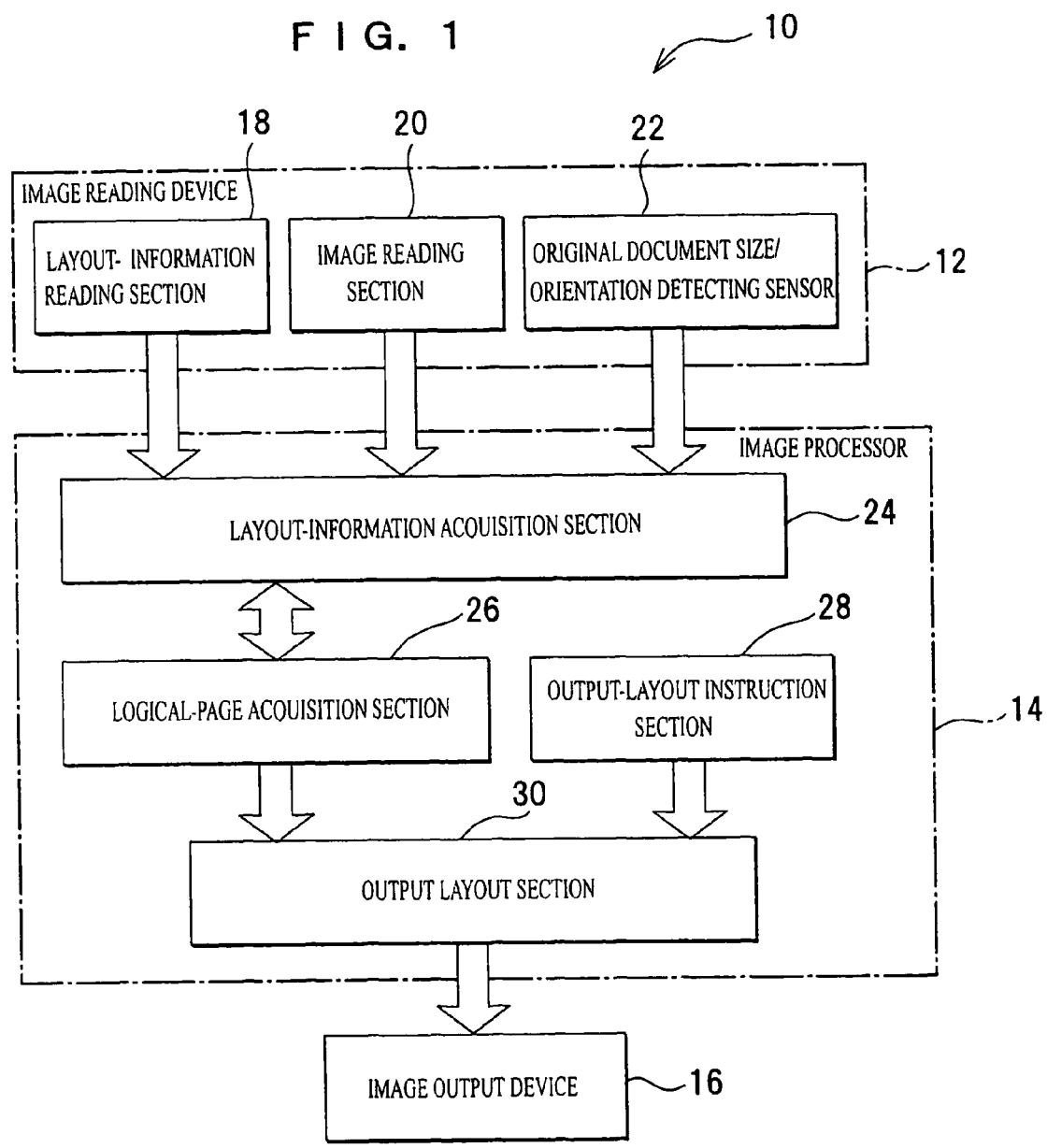
FIG. 1 is a block diagram showing the configuration of an image forming device according to an embodiment of the present invention.

Hereinafter, one example according to an embodiment of the present invention will be explained in detail, referring to the drawings. Here, the present invention is applied to an image forming device in the present embodiment.

FIG. 1 is a block diagram showing the configuration of the image forming device according to the present embodiment of the present invention.

The image forming device 10 according to the present invention includes: an image reading device 12; an image processor 14; and an image output device 16 as shown in FIG. 1.

The image reading device 12 contains an automatic original document reading device which is configured to include: a layout-information reading section 18; an image reading section 20; and an original document size/orientation detecting sensor 22, and to read images of an original document one by one after setting the original document on a not-shown document tray. Here, the image reading device 12 will be explained, assuming that the device 12 can discriminate a starting point and an ending point of an original document to be read. That is, one job unit can be discriminated.

The layout-information reading section 18 is configured to read layout information recorded in an original document beforehand, and, in the present embodiment, layout information recorded in a wireless IC tag provided in the original document beforehand is read.

Figure 2:
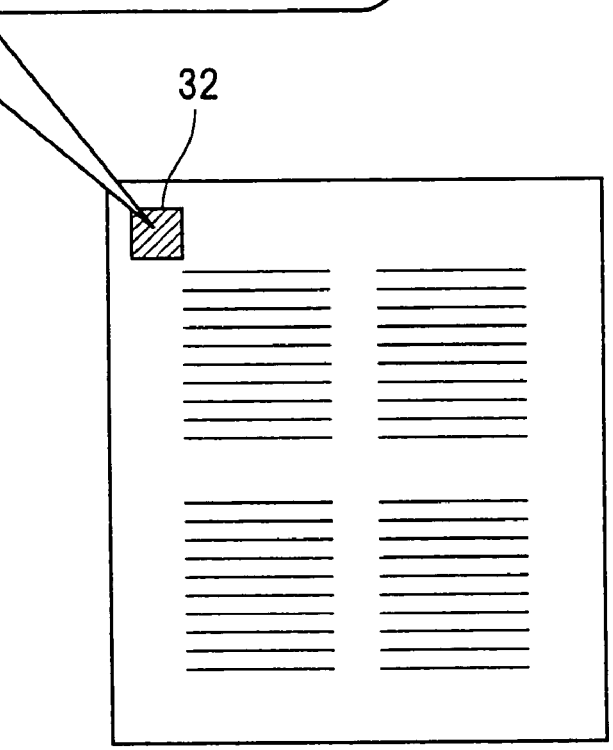
FIG. 2 is a view showing one example of a position at which a wireless IC tag is provided on an original document beforehand, and one example of layout information which is recorded in the wireless IC tag.

For example, radio frequency identification (RFID) can be applied to the wireless IC tag which the layout-information reading section 18 reads, and, as shown in FIG. 2, a wireless IC tag 32 is provided, for example, at any one of four corners of paper on which an original document is printed. And, when an original document is printed (made), there is recorded in the wireless IC tag 32 layout information relating to: the position of the provided wireless IC tag with respect to the original document; which of double-sided printing or single-sided printing is selected; the orientation of the back side with respect to the front one at double-sided printing; which of portrait printing or landscape printing is selected, based on which of vertical-oriented reference or horizontal-oriented reference is selected when a user refers to the printed original document; the number of logical pages in one page; and the arranged order of the logical pages. With regard to the position of the provided wireless IC tag with respect to the original document, information on the position of the wireless IC tag 32 when the front side of the original document is printed is configured to be, for example, any of four corners, that is, any one of the upper right, the upper left, the lower right and the lower left in the present embodiment. The reason is that an orientation in which the paper, on which the wireless IC tag 32 is provided, is set is undecided when the original document is printed. The layout-information reading section 18 reads the above layout information from the wireless IC tag 32. Furthermore, the layout-information reading section 18 detects the actual position of the wireless IC tag 32 at setting the original document, and acquires the position information.

The image reading section 20 photoelectrically reads images recorded in the original document, and outputs image data representing the images of the original document.

The original document size/orientation detecting sensor 22 is provided on a not-shown stand in the image reading device 12, and detects the size of the original document set on the above stand and information on horizontal and vertical characteristics of the original document (position relation of the short sides and the long sides). For example, a light-receiving and light-emitting element and the like can be used as an original document size/orientation detecting sensor 22.

The image processor 14 is configured to include: a layout-information acquisition section 24; a logical-page acquisition section 26; an output-layout instruction section 28; and an output-layout section 30.

The layout-information acquisition section 24 acquires layout information on an actual original document, wherein the information is recorded in the original document. That is, layout information which the layout-information reading section 18 has read from the wireless IC tag 32, and information on the actual position of the wireless IC tag 32 when the original document has been set are acquired. Moreover, image data output from the image reading section 20 is acquired by the layout-information acquisition section 24, and, at the same time, the size of the original document and the information on horizontal and vertical characteristics of the original document are acquired, wherein the size and the information have been detected by the original document size/orientation detecting sensor 22. Then, the layout-information acquisition section 24 discriminates, from the above information, the size of the original document, the horizontal and vertical characteristics of the original document, the number of logical pages in one page, the arranged order of the logical pages, the orientations of the logical pages, and the like.

The logical-page acquisition section 26 decomposes the image data, which has been acquired by the layout-information acquisition section 24, into logical pages for holding, based on the size of the original document, the horizontal and vertical characteristics of the original document, the number of logical pages in one page, the arranged order of logical pages, the orientation of the logical page, and the like, which have been discriminated by the layout-information acquisition section 24.

The output-layout instruction section 28 has a configuration by which an operator can specify desired output-layout information. The section 28 can be formed with a user interface including, for example, a numeric keypad, and a liquid crystal display, and an operator specifies output layout information, using the user interface. Specified information may includes, for example, information for specifying the size of output paper, and information for specifying a number N at Nup; when the number of pages is 2 or more, information for specifying the arranged order of logical pages, and information for specifying which of single-sided printing or double-sided printing is selected; in the case of double-sided printing, information for specifying the orientation of the back side with respect to the front one(short-side binding or long-side one), and the like. A type of, for example, a booklet may be acceptable as special specification.

The output-layout section 30 arranges each of the logical pages again after the logical pages divided by the logical-page acquisition section 26 are edited through scaling and the like according to the layout out instructed in the output-layout instruction section 28; generates data for output; and outputs the data to the image output device 16.

The image output device 16 forms images on paper, based on the data for output which is input from the output-layout section 30.

Figure 3:
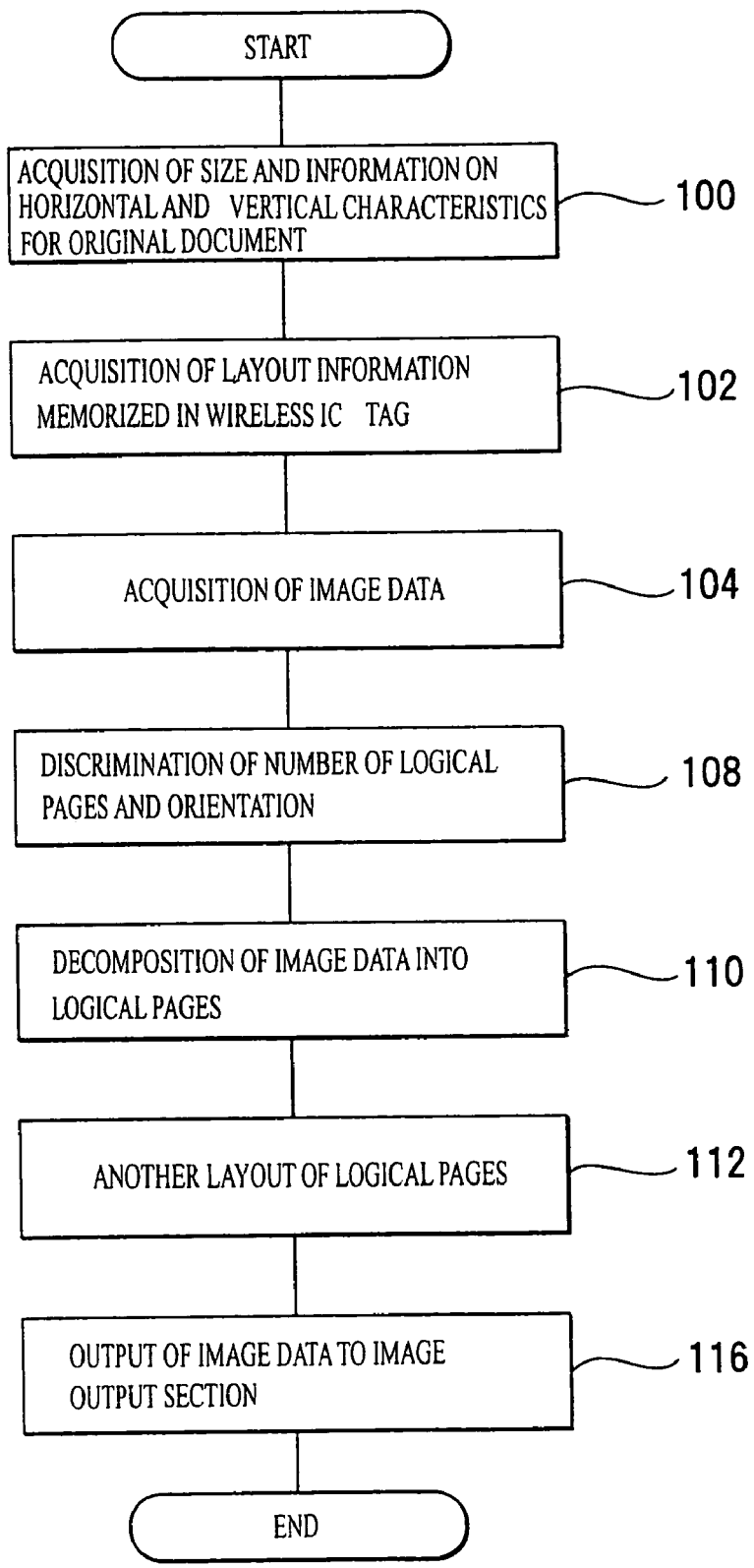
FIG. 3 is a flow chart showing one example of a processing flow for an image processor in the image forming device according to the embodiment of the present invention.

Subsequently, processing in the image processor 14 in the image forming device 10 with the above-described configuration will be explained. FIG. 3 is a flow chart showing one example of a processing flow for the image processor 14 in the image forming device 10 according to the embodiment of the present invention.

When an operator operates the output-layout instruction section 28; instructs layout for output from the image output device 16; sets an original document in the image reading device 12; and, gives a starting instruction, the image reading device 12 reads the images of the original document. Moreover, the size of the original document and the information on horizontal and vertical characteristics of the original document are detected when the original document is set in the image reading device 12.

Then, the size of the original document and information on the horizontal and vertical characteristics of the original document are acquired at STEP 100 in the image processor 14, and the processing goes to STEP 102. That is, the layout-information acquisition section 24 acquires the size of the original document and information on the horizontal and vertical characteristics of the original document, wherein the size and the information have been detected with the original document size/orientation detecting sensor 22 in the image reading device 12.

At STEP 102, the layout information recorded in the wireless IC tag is acquired, and the processing goes to STEP 104. That is, the layout-information reading section 18 in the image reading device 12 reads the wireless IC tag 32 which has been provided in the original document beforehand, and the layout-information acquisition section 24 acquires the obtained results.

Then, the image reading section 20 in the image reading device 12 reads image data representing the images of the original document, and the layout-information acquisition section 24 acquires the read image data at STEP 104. Subsequently, the processing goes to STEP 108.

The number of logical pages in the original document and the orientation of the original document are discriminated in the layout-information acquisition section 24 at STEP 108. Since an orientation in which the original document is set, and which of front side or back side of the original document is up are undecided when the images of the original document are acquired, which is the front side or the back side of the original document, and which is the top-bottom orientation of the original document cannot be specified. Accordingly, the original document size/orientation detecting sensor 22 detects the size of paper and the horizontal and vertical characteristics of the paper (position relation between the short side and the long side). Then, information related with which of double-sided printing or single-sided printing is selected; which of portrait printing or landscape printing is selected; the position of the wireless IC tag 32 with respect to the front side of the original document; and the like is read from the wireless IC tag 32; the top-bottom orientations are narrowed into two orientations, depending on which of portrait printing or landscape printing is selected; the top-bottom orientations are discriminated from the position of the wireless IC tag 32 with respect to the front side of the original document, wherein the position is recorded in the wireless IC tag 32; and, at the same time, it is discriminated which side is the front side or the back one of the original document. Subsequently, the number of logical pages and the arranged order of the logical pages are discriminated, wherein the number and the order have been read from the wireless IC tag 32.

For example, the layout-information acquisition section 24 discriminates, from the information on which of double-sided printing or single-sided printing is selected, which of the double-sided printing or the single-sided printing is selected, wherein the information has been recorded in the wireless IC tag 32, and narrows the top-bottom orientations into two orientations, using information on which of portrait printing or landscape printing is selected, wherein the information has been recorded in the wireless IC tag 32. If the portrait printing is selected, either of the short sides is the top orientation, and if the landscape printing is selected, either of the long sides is the top orientation. And, either of narrowed two orientations is judged to be the top orientation, using information on the position of the provided wireless IC tag 32 with respect to the front side of the original document, wherein the information has been recorded in the wireless IC tag 32, and information on the position of the wireless IC tag 32 with respect to the set original document, wherein the information has been detected by the layout-information reading section 18. Moreover, if information on the position of the provided wireless IC tag 32 with respect to the front side of the original document, wherein the information has been recorded in the wireless IC tag 32, and information on the actual position of the wireless IC tag 32, wherein the information has been detected by the layout-information reading section 18 are the same as each other for either of the narrowed two orientations, the orientation of the paper is discriminated to have the front-side orientation. When both of the information are not the same, the orientation of the paper is discriminated to have the back-side orientation.

Subsequently, at STEP 110, the image reading section 20 reads the original document for obtaining image data, and the logical-page acquisition section 26 decomposes the image data into logical pages with the number of pages, wherein the number is discriminated by the layout-information acquisition section 24. Moreover, the logical pages is decomposed, based on information on the back-side orientation with respect to the front-side in the case of double-sided printing of the original document, wherein the information has been acquired by the layout-information acquisition section 24, and the top-bottom orientation of the logical pages is prevented from being reversed. In the case of division into logical pages, information on the sizes of the logical pages, based on the size of the original document and the number of the logical pages, and, furthermore, information on the page order of the logical pages, based on the arranged order of the logical pages, are held together.

Subsequently, the logical pages decomposed at STEP 110 are laid out again in the output-layout section 30 at STEP 112 according to the layout instructed by the output-layout instruction section 28, and the processing goes to STEP 116. Moreover, when logical pages are laid out again in the output-layout section 30, a scaling rate for logical pages is decided in such a way that a scaling rate for the size of output paper is calculated, based on the size of the divided logical pages and, a scaling rate for logical pages to be output is calculated, using the number of N which is instructed in the output-layout instruction section 28, that is, a scaling rate for a case in which the logical pages are actually output on actual paper is calculated, and the logical pages are rearranged according to a specified layout order for output.

At STEP 116, the image data which has been laid out again is output to the image output device 16, and images are formed on paper with the image output device 16 according to the image data.

As described above, the image forming device 10 according to the present embodiment has a configuration in which layout information is recorded in the wireless IC tag 32 which is provided beforehand on the original document (the paper for the original document), and, when the original document is read, processing is performed by reading the layout information from the wireless IC tag 32. Accordingly, even when the original document is set in the image reading device 12 without consideration of the top-bottom orientation and the like of the original document, only specifying a desired layout enables the image forming device 10 to understand the top-bottom orientation of the original document including plural logical pages, and accurately decompose the logical pages for another layout.

Moreover, even when the formats of original documents are not the same as one another, the desired outputs with a uniform format can be similarly obtained only by specifying a desired output layout.

Here, though the above-described embodiment has a configuration in which the wireless IC tag 32 in which the layout of the original document is recorded is provided on paper beforehand, the present invention is not limited to the above embodiment. A similar effect as that of the present embodiment can be obtained by, for example, another configuration in which the layout information is recorded beforehand, using an invisible toner which reflects or absorbs ultraviolet rays or infrared rays, and the layout information is read.

Moreover, though processing in the image processor 14 has been explained in the above-described embodiment, processing in the image processor 14 according to the present embodiment may be realized by an image processing program by which a computer executes the processing. That is, the processing shown in FIG. 3 may be realized with a computer.

Though the present invention has been explained as described above, referring to the specific embodiment, the present invention should not be limited to the above embodiment.

As described above, according to a first aspect of the present invention, there is provided In the above-described aspect, the acquisition unit may be configured to acquire the layout information which the reading unit has read from the wireless IC tag provided at a predetermined position on the original document, and there may be applied another configuration in which, when the original document is printed, the layout information is recorded, using an invisible toner which reflects or absorbs ultraviolet rays or infrared rays, and the layout information read by the reading unit is acquired. That is, when the wireless IC tag is used, layout information of the original document can be read when the original document is read with the reading unit because the wireless IC tag is provided at a predetermined position on the original document, and the position of the wireless IC tag with respect to the original document and the layout information are recorded in the wireless IC tag when the original document is printed. Accordingly, the acquisition unit may acquire the layout information.

At this time, the wireless IC tag may have a configuration in which the position of the above-described provided wireless IC tag with respect to the above-described original document, the size of the above-described original document, which of double-sided printing or single-sided printing is selected, the orientation of the back side with respect to the front side at double sided printing, which of portrait printing or landscape printing is selected, based on which of vertical-oriented reference or horizontal-oriented reference is selected when a user refers to the original document, the number of logical pages in one page, and layout information including the arranged order of logical pages are recorded in the wireless tag beforehand. Thereby, a discriminating unit can discriminates the number of the logical pages in the original document, the arranged order of the logical pages, and the orientation of the original document. For example, the orientation of the original document is discriminated by the discriminating unit, based on the position of the wireless IC tag and the layout information which have been read by the reading unit. Thereby, the front side or the back side, and the top or the bottom of the original document may be discriminated, using the position at which the wireless IC tag has been read, and the position at which the wireless IC tag has been provided beforehand, and which has been recorded in the wireless IC tag.

Moreover, the image processor may be configured to be further provided with an instructing unit which instructs an output layout. For the output layout, which of double-sided printing or single-sided printing is selected, the orientation of the back side with respect to the front side at double-sided printing, the number of the logical pages in one page, and the arranged order of the logical pages may be specified, and a type of, for example, a booklet may be specified.

And, according to another aspect of the present invention, there is provided an image forming device with a configuration in which the image processor according to the above-described aspect is provided with a reading unit which reads the above-described original document, and an image forming unit which forms images, based on image data rearranged with the above-described rearranging unit.

Images with a desired layout can be obtained in the image forming device because the image forming device is configured to include the image processor, the reading unit reading the original document, and the image forming unit which forms images, based on the rearranged image data; and, according to the image processor, the desired output layout can be output only by reading the original document through the reading unit without consideration of the format, the orientation, and the like of the original document, as described above.

Moreover, according to further another aspects of the present invention, there are provided an image processing method, and a memorizing medium which stores programs by which a computer executes image processing.

As described above, according to the present invention, an original document in which layout information for images is recorded beforehand is read and the layout information is acquired; image data representing the images of the original document obtained by reading the original document is acquired; the number of logical pages in the original document, the arranged order of the logical pages, and the orientation of the original document are discriminated, based on the acquired layout information; the image data is decomposed into the logical pages; the decomposed logical pages are rearranged according to the predetermined output layout; and are output. Accordingly, there is an advantage that, even when the formats of original documents are not the same as one another, desired output layouts can be obtained.

What is claimed is:

1. An image processor, comprising:
   an acquisition unit that acquires image data and layout information of an original document which are obtained by reading the original document in which the layout information is recorded in advance;
   a discriminating unit that discriminates number of logical pages in the original document, an arranged order of the logical pages, and orientation of the original document, based on the layout information;
   a decomposing unit that decomposes the image data into the logical pages, based on the result of the discriminating; and
   a rearranging unit that rearranges the decomposed logical pages according to a predetermined output layout, and outputs image data in which the logical pages has been rearranged.

2. The image processor according to claim 1, wherein the acquisition unit acquires the layout information by reading a wireless IC tag which is installed in the original document and includes the layout information.

3. The image processor according to claim 2, wherein the layout information includes at least one of:
   a position at which the wireless IC tag is provided with respect to the original document;
   which of double-sided printing or single-sided printing is selected; orientation of a back side with respect to a front side for double-sided printing;
   which of portrait printing or landscape printing is selected;
   number of the logical pages in one page; and
   the arranged order of the logical pages.

4. The image processor according to claim 3, wherein the acquisition unit further acquires information on the position of the wireless IC tag, and the discriminating unit discriminates the orientation of the original document, based on the information on the position of the wireless IC tag and the layout information.

5. The image processor according to claim 1, further comprising
   an instructing unit that specifies the output layout, the output layout including at least any one of:
   which of double-sided printing or single-sided printing is selected; orientation of a back side with respect to a front side for double-sided printing;
   the number of the logical pages in one page; and
   the arranged order of the logical pages.

6. The image processor according to claim 1, wherein the original document is one page.

7. An image forming device, comprising:
   a reading unit that reads an original document, in which layout information is recorded in advance;
   an acquisition unit that acquires the layout information and image data of the original document from the reading unit;
   a discriminating unit that discriminates number of logical pages in the original document, an arranged order of the logical pages, and orientation of the original document, based on the layout information;
   a decomposing unit that decomposes the image data into the logical pages, based on the result of discriminating;
   a rearranging unit that rearranges the decomposed logical pages according to a predetermined output layout, and outputs image data in which the logical pages has been rearranged; and
   an image forming unit that forms images, based on the output image data.

8. The image forming device according to claim 7, wherein the original document is one page.

9. An image processing method, comprising:
   acquiring image data and layout information of an original document which are obtained by reading the original document in which the layout information is recorded in advance;
   discriminating number of logical pages in the original document, an arranged order of the logical pages, and orientation of the original document, based on the layout information;
   decomposing the image data into the logical pages, based on the result of the discriminating; and rearranging the decomposed logical pages according to a predetermined output layout, and outputs image data in which the logical pages has been rearranged.

10. The image processing method according to claim 9, wherein the original document is one page.

11. A storage medium readable by a computer, storing a program for image processing executed by the computer to perform a function comprising:

acquiring image data and layout information of an original document which are obtained by reading the original document in which the layout information is recorded in advance;

discriminating number of logical pages in the original document, an arranged order of the logical pages, and orientation of the original document, based on the layout information;

decomposing the image data into the logical pages, based on the result of the discriminating; and rearranging the decomposed logical pages according to a predetermined output layout, and outputs image data in which the logical pages has been rearranged.

12. The storage medium according to claim 11, wherein the layout information is acquired by reading a wireless IC tag which is installed in the original document and includes the layout information.

13. The storage medium according to claim 12, wherein the layout information includes at least one of:

a position at which the wireless IC tag is provided with respect to the original document;

which of double-sided printing or single-sided printing is selected; orientation of a back side with respect to a front side for double-sided printing;

which of portrait printing or landscape printing is selected;

number of the logical pages in one page; and the arranged order of the logical pages.

14. The storage medium according to claim 12, the function further comprising:

acquiring position information of the wireless IC tag; and discriminating the orientation of the original document based on the acquired position information.

15. The storage medium according to claim 12, the function further comprising giving an instruction for the output layout including at least any one of:

which of double-sided printing or single-sided printing is selected; orientation of a back side with respect to a front side for double-sided printing;

the number of the logical pages in one page; and the arranged order of the logical pages.

16. The storage medium readable by a computer according to claim 11, wherein the original document is one page.

* * * * *